Patented Sept. 11, 1951

2,567,719

UNITED STATES PATENT OFFICE 2,567,719

SUSPENSION OF VINYL CHLORIDE POLYMER IN POLYMERIZABLE LIQUID

John A. Loritsch, Scotia, and Patrick M. Di Cerbo, Schenectady, N. Y., assignors to General Electric Company, a corporation of New York No Drawing. Application March 18, 1948, Serial No. 15,746

7 Claims. (Cl. 260—31.8)

This invention is concerned with the production of improved coatings on base materials. More particularly, the invention is concerned with a liquid coating suspension comprising, by weight, (1) from 5 to 30 per cent of a dispersed phase of a finely divided solid material selected from the class consisting of polyvinyl acetals, polyvinyl chloride, and copolymers of a vinyl halide and a vinyl ester of a lower saturated aliphatic monocarboxylic acid and (2) a polymerizable liquid dispersing medium comprising (a) from 25 to 45 per cent of a liquid polymerizable composition containing two non-conjugated polymerizable $CH_2=C<$ groupings and (b) from 15 to 45 per cent of an unsaturated alkyd resin.

It has been known heretofore to coat or impregnate various surfaces or materials, for example, textile, fabrics, etc., with vinyl resins. Extensive use has been made of aqueous dispersions of vinyl resins, for example, dispersions of polyvinyl chloride or copolymers of vinyl chloride and vinyl acetate, etc., in a dispersion medium comprising water. In the usual procedure aqueous suspensions of the said polymeric materials are employed to coat or impregnate a fabric therewith, and thereafter removing the water and causing the particles of the polymeric materials to coalesce under the influence of heat or pressure. Quite often plasticizing agents have been employed with the polymeric materials in order to impart greater flexibility to the finely deposited coating.

Although such aqueous suspensions of polymeric materials have found extensive use in the field, nevertheless these materials are subject to many serious defects. It has been quite difficult to prepare suspensions which contain an appreciable per cent solids content due to the fact that the use of a high solids content results in an undesirable thickening and gelation of the suspension with attendant difficulties in coating. In addition, when dilute solutions or suspensions are employed, it is necessary to apply multiple coats in order to secure the requisite coating thickness; this involves the use of large volumes of volatile solvents (with attendant fire hazards) and water. Another defect lies in the fact that because of the presence of water in the suspension, it is difficult to blend modifying agents such as waxes, plasticizers and other resins with the suspended polymeric materials. Finally, these suspensions lack stability, and the water in the suspension causes shrinkage of paper and cloth and rusting of iron and steel when the water suspensions are employed to coat such materials.

Although it has been suggested that the water used as a dispersing medium be replaced by organic non-solvents, nevertheless such dispersions are subject to the same objections as when water is used. More particularly, it requires removal of the non-solvent after application of the dispersion as a surface coating, with attendant increase in cost and fire hazard. In addition, the removal of the non-solvent quite often results in an undesirable porosity of the deposited film.

We have now discovered that excellent single-coating compositions and protective films may be prepared by effecting suspension of a finely divided solid material selected from the class consisting of polyvinyl acetals (generically so designated), polyvinyl chloride, and copolymers of a vinyl halide and a vinyl ester of a lower saturated aliphatic monocarboxylic acid in a liquid dispersing medium comprising (a) a polymerizable composition of a liquid unsaturated alkyd resin and (b) a liquid polymerizable composition containing two polymerizable $CH_2=C<$ groupings.

To our knowledge this is the first time a liquid resinous suspension composed of a finely divided vinyl halide resin suspended in a dispersing liquid phase comprising a liquid polyallyl ester and a liquid unsaturated alkyd resin has been prepared in which all these ingredients comprising the coating suspension enter into and become an integral part of the final coating without the necessity of evaporating any inert solvent or dispersing medium with the attendant disadvantages described above. This one hundred per cent utilization of the coating composition is also significant from a cost saving standpoint in that in many applications only one dipping operation is necessary in order to obtain a coating of the desired thickness, thus obviating the necessity for additional coating equipment or coating operations. Single coatings of as much as ⅛ inch thickness have been applied in this way and it has been found that despite the high concentration of the finely divided dispersed phase in the dispersing medium, there is good penetration and impregnation of fabrics or porous objects it is desired to impregnate.

A further advantage in our claimed coating composition lies in the fact that with the application of reasonable temperatures (e. g., from 125° to 200° C.) to the coated object for a relatively short period of time, there are obtained films which are flexible, tough, non-tacky and substantially thermoset. In addition, good abrasion resistance and electrical properties, as well as good heat-aging characteristics, are inherent in our claimed coating compositions.

The finely divided solid material employed as the dispersed phase preferably comprises vinyl polymer resins of the class disclosed above wherein the average size of the particles is advantageously within the range of from about 10 to 100 microns in average diameter. However, the particular particle size is not critical and we do not intend to be limited to this particle size range since smaller or larger diameters may also be used.

Among the polyvinyl acetals (generically so designated) which may be employed in the practice of this invention may be mentioned, for example, polyvinyl formal, polyvinyl acetal (employing acetaldehyde for acetalization), polyvinyl propional, polyvinyl butyral, etc., resins. These resins (many examples and the preparation of which are more particularly disclosed in U. S. 2,215,996—Benton) are generally prepared, for example, by the partial hydrolysis under controlled conditions of polyvinyl acetate and the subsequent reaction of the partially hydrolyzed product with the particular aldehyde necessary to give the desired polyvinyl acetal. Thus, in the preparation of, for example, polyvinyl formal or polyvinyl butyral, polyvinyl acetate is partially hydrolyzed and thereafter reacted with either formaldehyde or butylaldehyde in accordance with procedures well known in the art to yield the particular polyvinyl acetal. As is well known, the characteristics of the polyvinyl acetal can be varied depending upon the particular aldehyde employed and the degree of hydrolysis of the polyvinyl acetate. It is, of course, understood that other methods familiar to those skilled in the art may also be employed in preparing the polyvinyl acetal, such as, for instance, starting with polyvinyl alcohol instead of polyvinyl acetate.

The copolymer of the vinyl halide and the vinyl ester of the lower saturated aliphatic monocarboxylic acid is preferably one in which the amount of vinyl halide, for example, vinyl chloride, vinyl bromide, vinyl fluoride, etc., preponderates, i. e., is present, by weight, at least in the majority, more particularly, it is present, by weight, in an amount equal to from 75 to 99.5, preferably from 95 to 99 per cent of the total weight of the vinyl halide and the vinyl ester.

Examples of vinyl esters of lower saturated aliphatic monocarboxylic acids which may be employed are, for example, vinyl esters of formic, acetic, propanoic, isopropanoic, butyric, isobutyric, hexanoic acids, etc. The copolymers of the vinyl halide and the vinyl esters may be prepared in manners now well known in the art, for example, by emulsion polymerization of the comonomers, etc.

The finely divided dispersed phase is preferably present in the liquid coating suspension in an amount equal to from 5 to 30 per cent, by weight, of the total coating composition, i. e., the dispersed phase and the polymerizable dispersing medium. Good results are obtained when from 10 to 25 per cent of the dispersed phase is present.

As examples of the unsaturated alkyd resin (both unmodified or modified, as pointed out in D'Alelio Patent 2,308,495, for instance, with the replacement of, say up to about 75 mol per cent of the unsaturated polycarboxylic acid with a non-ethylenic polycarboxylic acid, e. g., succinic, adipic, suberic, citric, phthalic, etc., or with anhydrides thereof; see also British Patent 540,168) employed in the instant invention, there may be mentioned many of the well-known polyhydric alcohol polyesters of alpha unsaturated alpha, beta polycarboxylic acids.

Thus, as the polyhydric alcohol, we may employ any polyhydric alcohol containing at least two esterifiable aliphatic hydroxyl groups (e. g., dihydric, trihydric, etc.) or mixtures thereof, for instance, ethylene glycol, diethylene glycol, tetraethylene glycol, propylene glycol, dipropylene glycol, butylene glycol, trimethylene glycol, glycerol, pentaerythritol, etc.

Among the alpha unsaturated alpha,beta polycarboxylic acids (or anhydrides) or mixtures thereof may be mentioned, for example, dicarboxylic acids or anhydrides, for instance, maleic, fumaric, itaconic, mesaconic, citraconic, etc., acids or anhydrides, etc.; citridic, carbic, etc., acids. It is, of course, understood that the unsaturated alkyd resins may be modified during the preparation thereof with other ingredients, for example, other alcohols, for instance, monohydric alcohols, such as cyclohexyl alcohol, butyl alcohol, tetrahydrofurfuryl alcohol, monophenyl ether of ethylene glycol, etc.

The liquid polymerizable composition containing two polymerizable $CH_2=C<$ groupings used in carrying the present invention into effect preferably, although not necessarily, embraces esters of organic ingredients containing at least two non-conjugated polymerizable terminal $CH_2=C<$ groupings. Thus, we may employ unsaturated monohydric alcohol polyesters of either saturated or unsaturated polycarboxylic acids or we may employ polymerizable unsaturated monocarboxylic acid esters of polyhydric alcohols. Among the unsaturated monohydric polyesters of polycarboxylic acids which may be employed may be mentioned, for instance, unsaturated monohydric alcohol polyesters of aromatic polycarboxylic acids (for example, diallyl phthalate, diallyl terephthalate, diallyl naphthalate, dimethallyl phthalate, diallyl tetrachlorophthalate, etc.), unsaturated monohydric alcohol polyesters of saturated aliphatic polycarboxylic acid (for example, diallyl oxalate, diallyl succinate, etc.), unsaturated monohydric alcohol polyesters of alpha unsaturated alpha, beta polycarboxylic acids (for example, diallyl maleate, dimethallyl fumarate, diallyl itaconate, etc.).

Examples of unsaturated monocarboxylic acid esters of polyhydric alcohols which may be employed are, for instance, ethylene glycol diacrylate, ethylene glycol dimethacrylate, propylene glycol diacrylate, etc.

In addition to the foregoing examples of the many polymerizable compositions containing two $CH_2=C<$ groupings, other compositions may also be mentioned, e. g., diallyl phenyl phosphonate, allyl acrylate, allyl diglycol carbonate, allyl allyloxyacetate, vinyl acrylate, diallyl carbonate, diallyl ether, divinyl benzene, vinyl allyl benzene, vinyl allyl ether, vinyl methallyl ether, etc. Other examples of polymerizable compositions containing two polymerizable $CH_2=C<$ groupings may be found in U. S. Patent 2,260,005 and in the applications disclosed therein.

As stated previously, the liquid polymerizable composition containing two polymerizable $CH_2=C<$ groupings and the unsaturated alkyd resins are present in amounts equal to from 25 to 45 per cent of the former and from 15 to 45 per cent of the latter, each of the percent ranges being based on the total weight of the dispersed phase and the polymerizable dispersing medium. We have found it advantageous in many cases to employ the polymerizable composition containing the two polymerizable CH₂=C< groupings within a smaller range, for example, from 30 to 40 per cent, by weight of the total weight of the ingredients, and the unsaturated alkyd resin in an amount equal to from 20 to 40 per cent, by weight, of the total weight of the ingredients.

Although the liquid coating composition may be used without the addition of any other modifiers, in many instances it may be desirable and preferable that a plasticizer be added thereto. The plasticizers which may be used with the resins comprising the coating suspension are advantageously those which are compatible with the finely divided polymer and having boiling points, preferably although not necessarily, at least above the temperature required to effect polymerization of the copolymerizable materials (for example, 125 to 200° C. or higher). The plasticizers which may be used are well known in the art and include among others, for instance, tricresyl phosphate, dibutyl phthalate, dioctyl phthalate, polycarboxylic acid polyesters of a nuclearly halogenated aryl ether alcohol, for intance, di-(para-chlorophenylethyl) sebacate, etc.; butyl phthalyl butyl glycolate, dioctyl sebacate, di-(2-ethylhexyl) tetrachlorophthalate, ethylene, glycol dioleate, polyester plasticizers, e. g., the Paraplexes, etc. The plasticizer preferably is added to the liquid coating composition after dispersion has been effected, although the plasticizer may be added at the same time as the finely divided polymer and copolymerizable ingredients.

The amount of plasticizer may, of course, be varied within wide limits depending on many factors, such as, for example, the application for which the coating composition is intended, the polymerizable compositions employed, the type of finely divided polyvinyl resins used, etc. Thus, we may advantageously employ, by weight, from 0.25 to 1.5 parts of the plasticizer per part of the finely divided solid material. Stated alternatively, the plasticizer may constitute, by weight, from 20 per cent to 60 per cent of the total weight of the plasticizer and finely divided vinyl resin. It is, of course, within the scope of this invention to use larger or smaller amounts of plasticizer depending on each particular situation. Because of their flame-proofing properties, we prefer to employ tricresyl phosphate with the polyvinyl acetal dispersion resins, and the same plasticizer and di-(2-ethylhexyl) tetrachlorophthalate for the polyvinyl chloride and copolymers of the vinyl halide and the vinyl ester.

Various modifying agents may be added to the liquid coating compositions. Thus, stabilizers may be added to stabilize the polyvinyl chloride or vinyl halide copolymers against decomposition by heat; among such stabilizers may be mentioned, e. g., lead carbonate, tin tetraphenyl, tin tetraethyl, lead silicate, etc. Any of the many well known stabilizers for vinyl halide resins may be used without departing from the scope of this invention (the amount of stabilizer depending on the particular formulation employed). We have found that from 1 to 20 per cent, by weight, of the weight of the vinyl halide copolymer or polyvinyl chloride may advantageously be used.

Additional modifying agents, such as de-tackifiers or waxes may also be used within the range of, for example, from 2 to 8 per cent, by weight, of the total weight of the polymeric and polymerizable compositions. We have found it advantageous, where fire-resistant and flame-resistant properties are desired, to add to the liquid coating composition halogenated waxy materials, for example, halogenated, e. g., chlorinated hydrocarbons, which are ordinarily employed for this purpose.

In order to accelerate the conversion of the copolymerizable materials comprising the dispersing medium, that is, the liquid polymerizable composition containing two polymerizable CH₂=C< groupings and the unsaturated alkyd resin, there may be added to the coating composition various cure accelerators (vinyl polymerization accelerators) well known in the art for the purpose. Among these may be mentioned, for example, inorganic super peroxides, e. g., barium peroxide, sodium peroxides, etc.; symmetrical diacyl peroxides, e. g., acetyl peroxide, lauroyl peroxide, benzoyl peroxide, etc.; tertiary butyl perbenzoate, tertiary butyl hydroperoxide, benzyl peroxide, cyclohexyl hydroperoxide, terpene peroxides, such as ascaridole, etc.; peroxides of the drying oils such as those formed upon oxidation of linseed oils, etc.; various other per compounds, for instance, perborates, perchlorates, etc.; dialkyl peroxides, for example, di-(tertiarybutyl) peroxide, lauryl peroxide, stearyl peroxide, etc. Tertiary butyl perbonzoate and benzoyl peroxide are the preferred catalysts. The percentage of the catalyst used is preferably within the range of from 0.02 to 2.5 per cent of the total weight of the polymerizable ingredients.

Although the coating suspension may be employed with the foregoing modifying agents without further change, it has been found desirable in many cases to add fillers to the coating composition to impart, for instance, improved abrasion resistance, etc. Among such fillers may be mentioned silica, carbon black, finely divided clays, lamp black, iron oxide, lithopone, calcium carbonate, etc. The amount of filler employed will vary depending on the particular application involved.

According to the present invention, the finely divided polymer, the polymerizable composition containing two CH₂=C< groupings and the unsaturated alkyd resin, which is prepared in accordance with techniques now well known in the art with or without modifiers (for example, monohydroxy alcohols, etc.), and any other modifying ingredients previously mentioned are mixed together and placed in a pebble mill, and the mixture ground preferably at around 20°–30° C. for a length of time varying, for example, from 4 to 100 hours until a smooth dispersion is obtained. After this grinding step, the material is ready to use for coating and impregnating applications. Alternatively, all of the ingredients, except the plasticizer, may be ground on a roll mill employed in grinding pigments into coating compositions. Thereafter, the plasticizer may be added if desired.

In order that those skilled in the art may better understand how the present invention may be practiced, the following examples are given by way of illustration and not by way of limitation. All parts are by weight.

In the following examples the term "copolymer of vinyl chloride-vinyl acetate" will be used to identify a conjoint polymer of vinyl chloride and vinyl acetate containing approximately 95 per cent vinyl chloride and 5 per cent vinyl acetate and having an average molecular weight of about 22,000 to 24,000.

The diethylene glycol maleate unsaturated alkyd resin employed in the examples below comprises a product of reaction of 1.1 mols diethylene glycol and 1 mol maleic anhydride. The materials are heated at about 180 to 200° C. while removing the water of esterification until an acid value of about 45 to 55 is obtained.

The glycerol cyclohexyl maleate unsaturated alkyd resin was prepared by reacting 1 mol of glycerol, 3 mols of maleic anhydride, and a quantity of cyclohexyl alcohol in excess of 3 mols at about 180 to 200° C. to an acid value of 25 to 35. The excess cyclohexyl alcohol was removed under reduced pressure at this stage.

The chlorinated paraffin recited in the examples below comprises the waxy product of chlorination of long chain aliphatic hydrocarbons containing from 5 to 10 carbon atoms. This material was employed primarily as a detackifier.

Example 1

| | Parts |
|---|---|
| Diallyl phthalate | 494 |
| Glycerol cyclohexyl maleate | 296 |
| Di-(2-ethylhexyl) tetrachlorophthalate (plasticizer) | 454 |
| Finely divided copolymer of vinyl chloride-vinyl acetate | 488 |
| Chlorinated paraffin wax | 76 |
| Tertiary butyl perbenzoate | 4.2 |

The chlorinated paraffin wax was dissolved in the diallyl phthalate and the remaining ingredients were added separately and the entire mixture stirred well. The dispersion was then ground for 72 hours in a pebble mill. This dispersion had a stability greater than four months.

A textile sleeving (20 mils thick) was dipped in this dispersion and thereafter cured for ten minutes at 160° C. At the end of this time measurement of the thickness of the resin coating was 18 mils. This sleeving, when tested according to A. S. T. M. D372–45T specification was found to withstand a voltage of 22,250 volts at breakdown.

Example 2

The formulation in this case was identical with the one in Example 1 with the exception that 454 parts tricresyl phosphate were employed in place of the di-(2-ethylhexyl) tetrachlorophthalate used in Example 1. This coating composition could be employed for impregnating and coating various textile materials which, when heated at around 150° C., gave infusible, insoluble coatings having good flame resistance and strong abrasion resistance.

Example 3

| | Parts |
|---|---|
| Diallyl phthalate | 267.1 |
| Glycerol cyclohexyl maleate | 160.8 |
| Di-(2-ethylhexyl) tetrachlorophthalate | 245.4 |
| Chlorinated hydrocarbon | 41.2 |
| Finely divided copolymer of vinyl chloride-vinyl acetate | 264.3 |
| Lead silicate [1] | 21.2 |

[1] This lead silicate analyzed for 60 to 61 per cent PbO and 39 to 40 per cent SiO$_2$ and was employed as a stabilizer for the finely divided copolymer.

All the above constituents were thoroughly mixed together and placed in a pebble mill and ground 72 hours at 25° to 30° C. to yield a smooth dispersion.

To the above dispersion was added about 0.23 per cent, by weight, tertiary butyl perbenzoate, and cotton cloth was dipped in the dispersion and baked 10 minutes at 165° C. to produce a tough, flexible film. The resultant coated fabric, when heat-aged at 125° C., retained its flexibility even after 384 hours of continuous exposure. Sharp creasing of the heat-aged product failed to cause any cracking of the resinous film.

Example 4

| | Parts |
|---|---|
| Diallyl phthalate | 266.3 |
| Glycerol cyclohexyl maleate | 159.6 |
| Di-(2-ethylhexyl) tetrachlorophthalate | 244.0 |
| Chlorinated hydrocarbon | 40.8 |
| Finely divided copolymer of vinyl chloride-vinyl acetate | 262.7 |
| Basic lead carbonate (stabilizer for the finely divided copolymer) | 21.6 |
| Lamp black | 0.503 |

All the above ingredients were placed together in a pebble mill and ground for 72 hours at 25° to 30° C. to yield a smooth dispersion.

To the above dispersion was added 0.4 per cent, by weight, tertiary butyl perbenzoate. Varnished cambric was passed through a bath of the above dispersion in such a way that only one side of the cambric received a coating. The coating cambric was baked for 12 minutes at 120° C. and thereafter the cured film was stripped from the cambric. This film was a flexible, tough, thermosetting tape suitable for insulation for bus bars, armature coils, etc. This tape can be heat-sealed and will remain flexible on curing.

Example 5

| | Parts |
|---|---|
| Tetraethylene glycol dimethacrylate | 41 |
| Diethylene glycol maleate | 41 |
| Finely divided polyvinyl formal [1] | 18 |

[1] This material was obtained by hydrolyzing polyvinyl acetate until there was present approximately 95 per cent OH groups, and thereafter reacting the hydrolyzed product with formaldehyde.

All the above constituents were placed in a pebble mill and ground for 24 hours at 25° to 30° C. To this dispersion was added 1 per cent, by weight, tertiary butyl perbenzoate, and a coil comprising 8 turns of 50-mil copper wire, which had been previously wound on a mandrel and the mandrel removed, was dipped in the catalyzed material. The coil was cured at 125° C. for two hours and thereafter embedded in a hard copolymer of di allyl phthalate and diethylene glycol maleate This coil was heat-aged at 150° to 160° C. for seven months and at the end of this time it was found that the insulation around the copper wire was still intact and tough and, in addition, there was no evidence of crazing.

Example 6

| | Parts |
|---|---|
| Tetraethylene glycol dimethacrylate | 33 |
| Diethylene glycol maleate | 33 |
| Polyvinyl formal (same as that employed in Example 5) | 17 |
| Tricresyl phosphate (plasticizer) | 17 |

As in the previous examples, the ingredients were mixed together and placed in a pebble mill and ground for 24 hours at 25° to 30° C. To this ground product was added 1 per cent, by weight, tertiary butyl perbenzoate, and a copper coil was treated with the material in the same way as in Example 5 to give identical results.

Example 7

| | Parts |
|---|---|
| Diallyl phthalate | 40 |
| Diethylene glycol maleate | 40 |
| Polyvinyl formal (same as that employed in Example 5) | 20 |

The ingredients were placed in a pebble mill and ground for 24 hours at 25° to 30° C. The product obtained after grinding was thoroughly mixed with 2 per cent, by weight, benzoyl peroxide and this dispersion was brushed on three sheets of glass cloth which were then superposed upon each other and laminated in a press at 40 pounds p. s. i. pressure, and 125° C. for 15 minutes. A tough, well-bonded laminate was formed showing the excellent bonding characteristics of our claimed composition. Such outstanding adhesion properties were obtained without the necessity of any solvent.

Example 8

| | Parts |
|---|---|
| Finely divided polyvinyl chloride resin | 294 |
| Glycerol cyclohexyl maleate | 178 |
| Diallyl phthalate | 296 |
| Tricresyl phosphate | 159 |
| Chlorinated paraffin wax | 45 |
| Lead silicate | 23 |
| Lamp black | 5 |
| Tertiary butyl perbenzoate | 3 |

All the foregoing ingredients, with the exception of the tricresyl phosphate and tertiary butyl perbenzoate, were ground on a roll mill until a homogeneous dispersion was obtained. Thereafter the plasticizer and catalyst, tertiary butyl perbenzoate, were added and the mass again thoroughly mixed on the roll mill to obtain a homogeneous coating dispersion. Cotton cloth was passed through this dispersion to coat both sides of the cloth. Thereafter the treated cloth was heated for 10 minutes at 190° C. to give a coated product exhibiting a strong, coherent, filmed surface which was substantially infusible and insoluble and yet quite flexible.

Our claimed compositions may have use for other purposes. For example, they may be knife-coated on various textiles or other bases for making, for example, raincoats, tents, etc. Surfaces other than cloth or paper may be coated with these compositions such as those of glass, steel, aluminum, copper, wood, plasterboard, various plastic materials, rubber, nylon and other fabrics made of synthetic resin yarn. Corrosion-resistant tank and pipe linings can also be made from these suspensions. The suspensions also may be employed as adhesives for textiles, metal, paper, leather and vinyl resin sheet material.

The claimed compositions of matter have particular utility as sleeve varnishes wherein all components of the suspension enter into and become an integral part of the final cured product. In addition, the claimed compositions may be applied as wire enamels by drawing a wire through a bath containing the suspensions and thereafter baking the coated wire. The deposited films have outstanding electrical resistance and heat-aging properties and may be used for insulating parts of electrical motors, cables, etc. They may also be employed for coating and enclosing field windings by heating the latter and dipping them in our claimed dispersions. It is also possible to form hollow articles such as gloves, balloons and the like from the suspensions by dipping a form into the suspensions, removing the form and baking and withdrawing the article from the form.

What we claim as new and desire to secure by Letters Patent of the United States is:

1. A liquid preformed homogeneous coating suspension comprising, by weight, (1) from 5 to 30 per cent of a dispersed phase of a finely divided solid material having an average particle size below 100 microns and being selected from the class consisting of polyvinyl chloride and copolymers of vinyl chloride and a vinyl ester of a lower saturated aliphatic monocarboxylic acid in which the vinyl chloride comprises at least about 95 per cent of the total weight of the polymerizable materials used in making the copolymer, (2) a liquid dispersing medium comprising (a) from 25 to 45 per cent of a liquid polyallyl ester of a polycarboxylic acid and (b) from 15 to 45 per cent of a liquid polymerizable unsaturated alkyd resin obtained by effecting reaction between a polyhydric alcohol and an alpha unsaturated alpha, beta polycarboxylic acid, and (3) from 0.25 to 1.5 parts, by weight, of a liquid plasticizer per part of the finely divided polymer described above in (1).

2. A liquid preformed homogeneous coating suspension comprising, by weight, (1) from 5 to 30 per cent of a dispersed phase of finely divided solid polyvinyl chloride having an average particle size of from about 10 to 100 microns, (2) a liquid dispersing medium comprising (a) from 25 to 45 per cent of a liquid polymerizable composition comprising a polyallyl ester of an aromatic polycarboxylic acid and (b) from 15 to 45 per cent of a liquid polymerizable unsaturated alkyd resin obtained by effecting reaction between a dihydric alcohol and an alpha unsaturated alpha, beta dicarboxylic acid, and (3) from 0.25 to 1.5 parts, by weight, of a liquid plasticizer per part of the finely divided polymer described above in (1).

3. A liquid preformed homogeneous coating composition comprising, by weight, (1) from 5 to 30 per cent of a dispersed phase of a finely divided solid product having an average particle size of from about 10 to 100 microns and being the product of conjoint polymerization of vinyl acetate and vinyl chloride wherein the vinyl chloride comprises at least 95 per cent, by weight, of the total weight of the vinyl acetate and vinyl chloride, (2) a liquid dispersing medium comprising (a) from 30 to 40 per cent diallyl phthalate and (b) from 20 to 40 per cent of a liquid polymerizable unsaturated alkyd resin comprising cyclohexyl glyceryl maleate, (3) from 0.25 to 1.5 parts, by weight, of di(2-ethylhexyl) tetrachlorophthalate per part of the finely divided polymer described above in (1), and (4) a stabilizer for (1).

4. A liquid preformed homogeneous coating suspension comprising, by weight, (1) from 10 to 25 per cent of a dispersed phase of a finely divided solid material having an average particle size of from about 10 to 100 microns and comprising a copolymer of vinyl chloride and vinyl acetate in which the vinyl chloride comprises at least about 95 per cent of the total weight of the polymerizable materials used in making the copolymer, (2) a liquid dispersing medium comprising (a) from 30 to 40 per cent diallyl phthalate and (b) from 20 to 40 per cent of a polymerizable unsaturated alkyd resin comprising cyclohexyl glyceryl maleate, and (3) from 0.25 to 1.5 parts, by weight, of a liquid plasticizer per part of the finely divided polymer described above in (1).

5. A liquid preformed homogeneous coating suspension comprising, by weight, (1) from 5 to 30 per cent of a dispersed phase of a finely divided solid material having an average particle size of from about 10 to 100 microns and comprising a copolymer of vinyl chloride and vinyl acetate in which the vinyl chloride comprises at least about 95% of the total weight of the latter and the vinyl acetate, (2) a liquid dispersing medium comprising (a) from 25 to 45 per cent of a liquid polyallyl ester of a polycarboxylic acid and (b) from 15 to 45 per cent of a liquid polymerizable unsaturated alkyd resin comprising cyclohexyl glyceryl maleate, and (3) from 0.25 to 1.5 parts, by weight, of a liquid plasticizer per part of the finely divided polymer described above in (1).

6. A liquid performed homogeneous coating suspension comprising, by weight, (1) from 5 to 30 per cent of a dispersed phase of a finely divided solid material having an average particle size of from about 10 to 100 microns and being selected from the class consisting of polyvinyl chloride and copolymers of vinyl chloride and a vinyl ester of a lower saturated aliphatic monocarboxylic acid in which the said vinyl chloride comprises at least about 95 per cent of the total weight of the vinyl chloride and the vinyl ester, (2) a liquid dispersing medium comprising (a) from 25 to 45 per cent of a liquid polyallyl ester of a polycarboxylic acid and (b) from 15 to 45 per cent of a liquid polymerizable unsaturated alkyd resin obtained by effecting reaction between a polyhydric alcohol and an alpha unsaturated alpha, beta polycarboxylic acid, and (3) from 0.25 to 1.5 parts, by weight, of a liquid plasticizer per part of the finely divided polymer described above in (1) wherein the plasticizer comprises di-(2-ethylhexyl) tetrachlorophthalate.

7. A liquid preformed homogeneous coating suspension comprising, by weight, (1) from 10 to 25 per cent of a dispersed phase of a finely divided solid material having an average particle size of from about 10 to 100 microns and comprising a copolymer of vinyl chloride and vinyl acetate in which the vinyl chloride comprises at least about 95 per cent of the total weight of the vinyl chloride and vinyl acetate, (2) a liquid dispersing medium comprising (a) from 25 to 45 per cent of diallyl phthalate and (b) from 15 to 45 per cent of a liquid polymerizable unsaturated alkyd resin comprising diethylene glycol maleate, and (3) from 0.25 to 1.5 parts, by weight, of a liquid plasticizer per part of the finely divided polymer described above in (1).

JOHN A. LORITSCH.
PATRICK M. DI CERBO.

REFERENCES CITED

The following references are of record in the file of this patent:

UNITED STATES PATENTS

| Number | Name | Date |
|---|---|---|
| 2,155,590 | Garvey | Apr. 25, 1939 |
| 2,188,396 | Semon | Jan. 20, 1940 |
| 2,215,996 | Benton | Sept. 24, 1940 |
| 2,254,072 | Jenkins | Aug. 26, 1941 |
| 2,409,633 | Kropa | Oct. 22, 1946 |
| 2,431,078 | Powell et al. | Nov. 18, 1947 |
| 2,443,740 | Kropa | June 22, 1948 |
| 2,460,574 | Gresham | Feb. 1, 1949 |
| 2,464,568 | Flynn et al. | Mar. 15, 1949 |
| 2,528,235 | Loritsch | Oct. 31, 1950 |

OTHER REFERENCES

Powell et al., Official Digest, pp. 696 and 700, Dec. 1946.

Garvey et al., Ind. & Eng. Chem., pp. 1060 and 1062, Aug. 1941.